Figure 3:
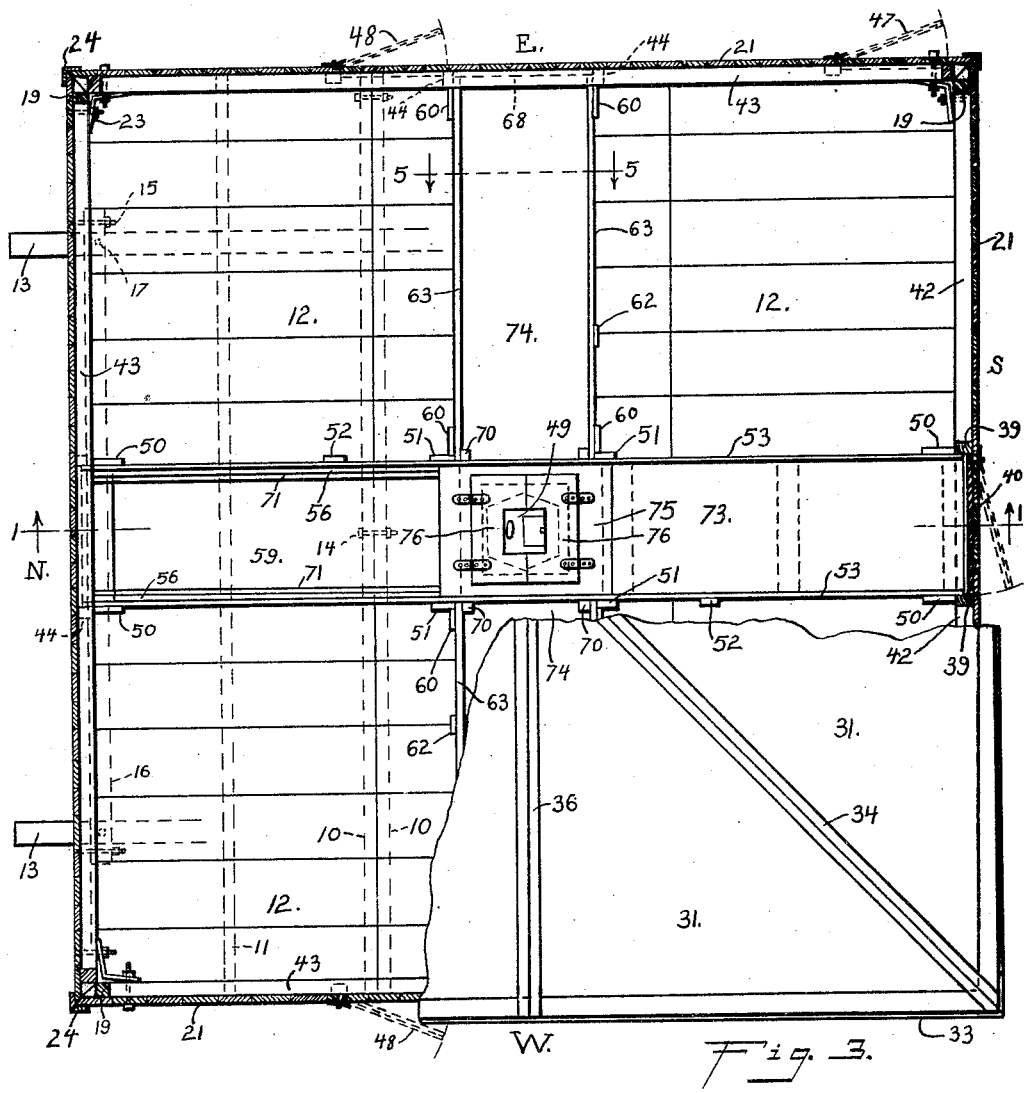

Dec. 30, 1930.  E. B. MORRIS  1,786,769
FARROWING HOUSE
Filed Aug. 20, 1927   3 Sheets-Sheet 1
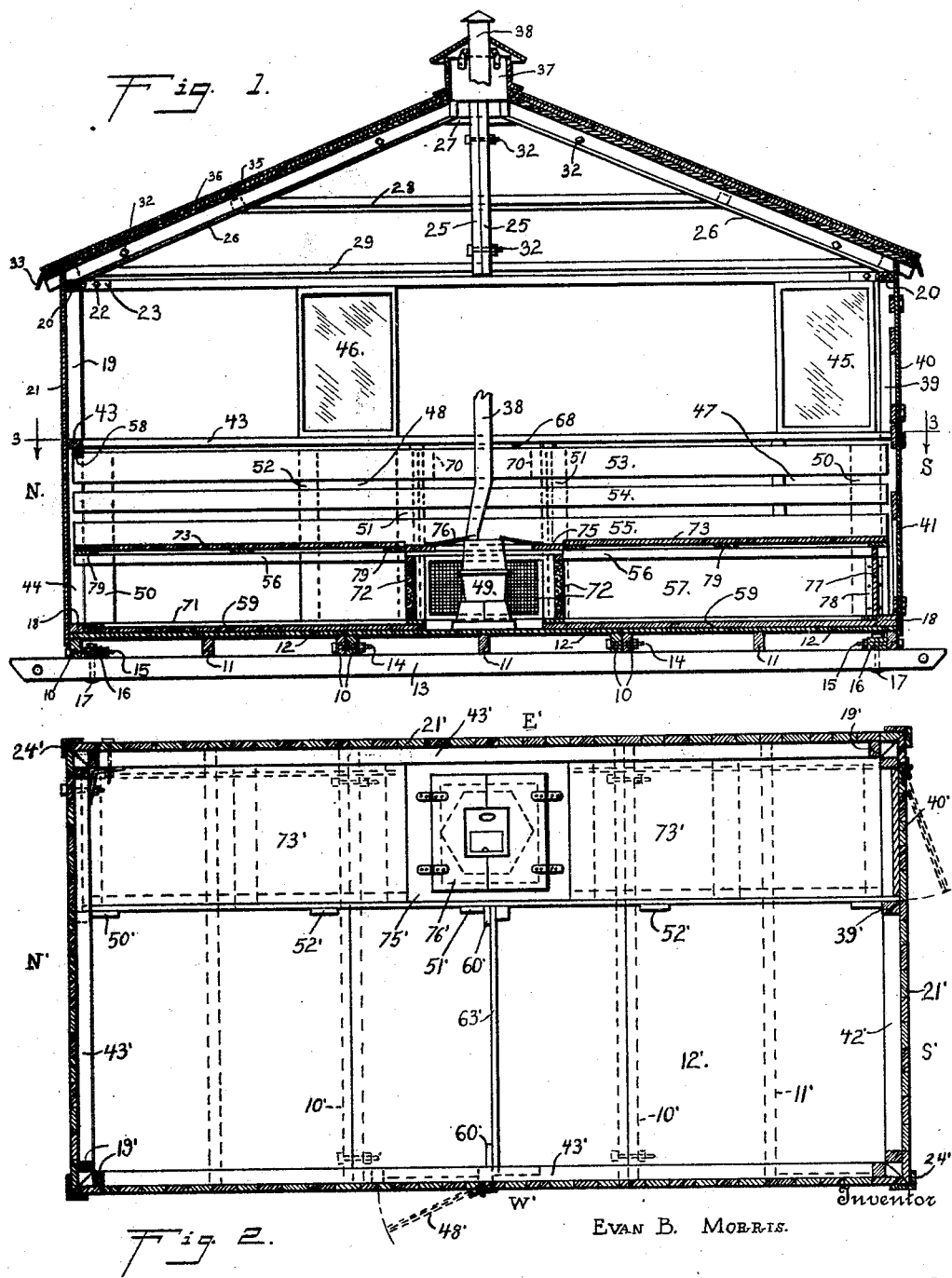

Dec. 30, 1930.  E. B. MORRIS  1,786,769
FARROWING HOUSE
Filed Aug. 20, 1927   3 Sheets-Sheet 2

Evan B. Morris. Inventor

By David O. Barnell
Attorney

Dec. 30, 1930.  E. B. MORRIS  1,786,769
FARROWING HOUSE
Filed Aug. 20, 1927  3 Sheets-Sheet 3
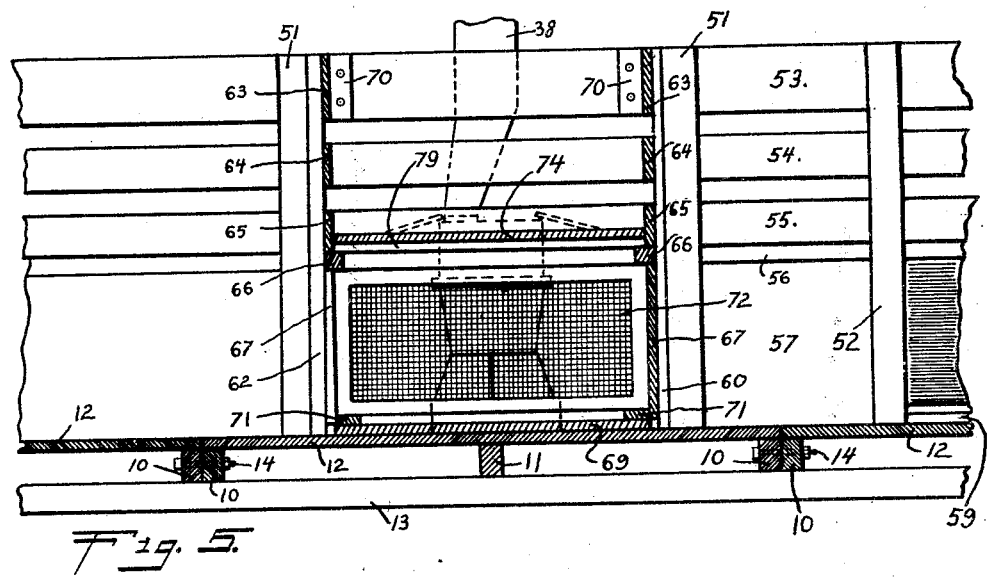
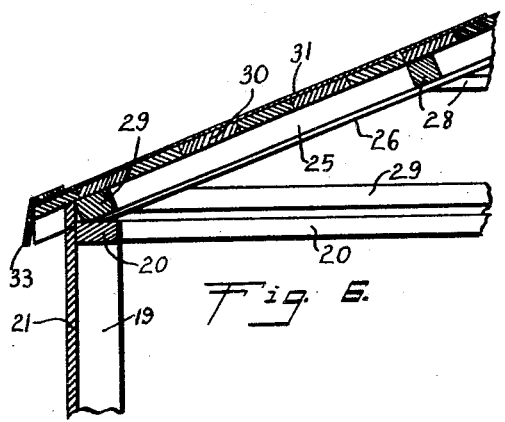
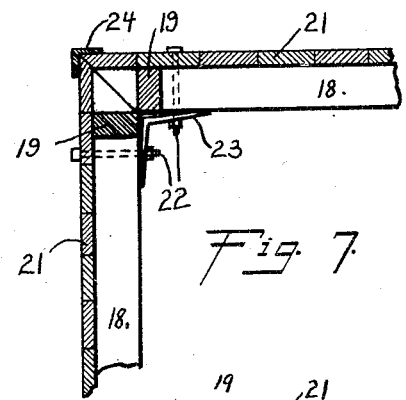
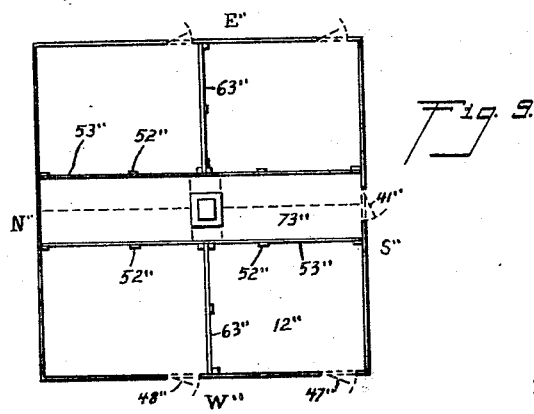
Evan B. Morris, Inventor
By David O. Barnell
Attorney Patented Dec. 30, 1930

1,786,769

UNITED STATES PATENT OFFICE

EVAN B. MORRIS, OF CEDAR BLUFFS, NEBRASKA; MARY L. MORRIS ADMINISTRATRIX OF THE ESTATE OF SAID EVAN B. MORRIS, DECEASED

FARROWING HOUSE

Application filed August 20, 1927. Serial No. 214,314.

My invention relates to animal housing and sheltering structures, and particularly to structures for use in the farrowing of swine, lambing of ewes, and the like. It is the object of my invention to provide in a structure of this class means forming a plurality of pens for the adult animals, each of said pens having associated therewith a communicating auxiliary space or litter pen, which is accessible to the young or smaller animals and from which the adult or larger animals are excluded. A further object of my invention is to provide, in connection with the foregoing structure, heating means situated symmetrically to the several litter pens and adapted to warm uniformly the adjacent portions of said pens, while the remoter portions of said pens are left cooler, whereby the young or smaller animals are induced to occupy those portions of the pens at which the temperature maintained is most desirable and beneficial to them. A further object of my invention is to provide a portable and sectional building structure adapted to be economically manufactured in quantity at a suitable point for distribution, transported in knock-down form to or adjacent to the location at which it is to be used, then erected, and thereafter moved from place to place locally without being disassembled. A further object is to provide in such a building structure means facilitating the erection or assembly of the floor, wall and roof panels or sections, whereby tight joints may be secured at the wall-corners and at the adjoining edges of the roof-sections, and to provide means for stopping the flat roof-joints to prevent leakage of water at said joints. A further object is to provide a building of this class in which the interior structural members for forming the pens are readily removable to enable the use of the building as a colony house after the end of the farrowing or lambing season, and when the young animals have attained a size at which special protection for them is not required. A further object is to provide a structure of this class in which all of the pens are readily accessible to an attendant entering the building at a single door and without passing through any of the pens. A further object is to provide means by which the attendant may have ready access to the heating means and to each of the litter pens, for cleaning the latter, renewing the bedding, and caring for the young animals, and for cleaning and refueling the heating means. A further object is to provide a multiple-pen farrowing house with auxiliary or litter-pens of an elongated formation, heated at one end and unheated at the other end, whereby to afford the young animals a range or variety of temperature conditions, while being at all times safe from injury by the adult animals in the main pens. Further and more particular objects of my invention will be set forth hereinafter.

Figure 4:
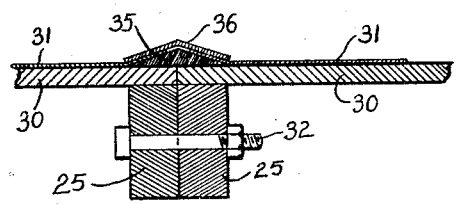

In the accompanying drawings Fig. 1 is a vertical longitudinal section of a farrowing house embodying my invention and arranged to provide four pens therein the section being on the plane of the line 1—1 of Fig. 3, Fig. 2 is a horizontal section and floor-plan of a similar structure having two pens, Fig. 3 is a plan view, partially in horizontal section, of the four-pen house shown in Fig. 1, the sectional portion of the view being taken on the plane of the line 3—3 of Fig. 1, Fig. 4 is a detail transverse sectional view of one of the roof-joints, Fig. 5 is a detail vertical section on the line 5—5 of Fig. 3, Fig. 6 is a detail vertical section through a portion of the roof and a side-wall, Fig. 7 is a detail horizontal section through a corner of the building, showing the same drawn tight by the corner-plate, Fig. 8 is a similar view showing the relation of the parts before the tightening of the corner-plate bolts, and Fig. 9 is a diagrammatic floor-plan showing a slightly modified arrangement of a four-pen structure.

In carrying out my invention to provide a four-pen house, such as shown particularly in Figs. 1, 3 and 5, the building is substantially square in plan outline, while in the two-pen structure represented in Fig. 2 the plane outline is an oblong rectangle. The latter structure may be regarded as a modification of the first, and the modifications will be referred to in detail, following the description of the four-pen structure. The modified four-pen structure shown in Fig. 9 is also substantially square in plan outline.

Referring particularly to the normal four-pen house, the floor is preferably formed by three similar oblong rectangular sections each having a pair of joists 10 at its longitudinal edges, a center-joist 11, and floor-boards 12 laid transversely upon said joists. Said floor-sections are assembled side by side upon a pair of skids or runners 13, the adjoining side-joists 10 being secured together by bolts 14, the outer side-joists being secured by bolts 15 to cross-pieces 16 extending between and resting upon the runners 13, said cross-pieces being disposed at the inner sides of the respective joists to which they are secured, and being secured to the runners by bolts 17. The wall-sections S, N, E and W are erected at the edges of the square platform formed by the assembled floor-sections, each wall-section having a lower horizontal frame-member or sill 18 which rests upon the floor, vertical corner-studs 19, an upper horizontal frame-member or plate 20, intermediate studding and horizontal frame-members more particularly referred to hereinafter, and vertically extending siding 21 which is secured to the horizontal frame-members and extends slightly above the plate 20 and below the sill 18, the latter extended portion abutting the edges of the floor or platform. At the corners the wall sections are preferably secured to each other by means of bolts 22 extending through the obtuse-angled corner-plates 23, of which the formation is best shown in Figs. 7 and 8, said corner-plates being slightly yieldable under the pressure exerted thereon by the bolts, the pressure tending to force the plate to a right-angled formation, whereby each of the connected wall sections will be pulled toward the end of the other, and a tight corner-joint between the sections thus assured. Metal angle-strips 24 are secured upon the corners externally, as shown.

The roof of the building is pyramidal, each plane thereof being formed by two right-triangular sections, each of said roof-sections having at one edge a short rafter 25 and at the opposite edge a long rafter 26, said rafters being connected respectively at their upper, intermediate and lower portions by horizontal frame-members 27, 28 and 29, the frame formed by said rafters and horizontal members being covered by sheeting 30, and the latter covered by composition roofing 31. The rafters 25 at the short edges of the roof-sections are secured to each other by bolts 32, and the long rafters 26 at the corners of the roof are similarly connected. The lower horizontal roof-frame members 29 are proportioned to rest upon the wall-plates 20, and the siding 21 is notched to receive the portions of the rafters which extend to form the eaves. At the eaves, metal angle-strips 33 are secured over the edges of the composition roofing 31, the vertical flanges of said strips being extended down to form drip-guides, as shown in Fig. 6. At the corners of the roof the joints between the sections are covered by metal battens 34. The joints at the short edges of the roof-sections are preferably formed as shown in Fig. 4. A beveled wood batten 35 is inserted beneath the edges of the roofing 31, so that said edges are inclined slightly upward, and said inclined edges are then covered by the metal batten 36 which is formed to fit the bevel of the inner member 35. At the apex of the roof the rafters of the several sections terminate at the cross-members 27, so that an opening is provided between said members, and said opening is covered by a sheet-metal ventilator 37, the top of said ventilator being pierced by the smoke-pipe 38 from the stove or heater 49.

The wall S appearing at the right-hand side of Figs. 1 and 3 may be considered as the front of the building, and at the center of said wall section a pair of studs 39 are extended from the sill 18 to the plate 20 to form a door-frame. In said door-frame is hinged a door which is preferably formed in separate upper and lower sections 40 and 41, arranged so that the upper section 40 may be opened while the lower section 41 remains closed. In the front wall section S an intermediate horizontal frame-member or rail 42 is extended from the corner-studs 19 to the door-studs 39, and in the rear section N and the two side wall sections E and W an intermediate frame-member or rail 43 is extended continuously between the corner-studs. In said rear section N and side wall sections E and W adjacent to the center thereof a pair of short intermediate studs 44 are provided, extending down from the rail 43 to the respective sills 18. Above the rail 43 in each side wall section there are provided two windows 45 and 46, the first being adjacent to the front corner, and the second being rearward of the longitudinal center. In the lower portion of each side wall section, below the rail 43 and alined vertically with the respective windows 45 and 46, are small doors 47 and 48, for use of the animals in the several pens with which said doors communicate. The rear wall section N has no openings therein.

The stove or heater 49 is disposed upon the floor 12 at the center of the building, directly beneath the ventilator 37, and between a pair of main longitudinal partitions which extend through continuously from the front wall S to the rear wall N. Each of said main partitions has a pair of vertical end-members or stiles 50, a central pair of stiles 51 adjacent to the heater, and one additional stile 52 disposed at a position intermediate the center and one of the end-stiles 50. The lower ends of all of said stiles rest upon the floor 12, and the edges of the end-stiles 50 abut the inner edges of the door-studs 39 and the intermediate studs 44 of the rear wall N. The rails or longitudinal members of the partitions lap onto the adjacent sides of the studs 39 and 44, thus preventing outward displacement of the partitions as a whole. Said rails or longitudinal members comprise the relatively narrow, vertically spaced upper and intermediate boards 53, 54 and 55, which are continuous from end to end of the partitions, the ledge-strips 56 which are secured to the stiles adjoining the lower edges of the boards 55, and the wide boards 57 which form the sides of the litter-pens and are not continuous, being omitted between the center-stiles 51 and between the stile 52 and the adjacent end-stile 50. At each side of the main longitudinal partitions, and extending therefrom to the walls E and W, are pairs of cross-partitions each having a pair of end-stiles 60, and longitudinal or rail members 63, 64, 65, 66 and 67, corresponding respectively to the members 53, 54, 55, 56 and 57 of the main partitions. One of each pair of the cross-partitions has an extra stile 62, and between the same and the adjacent wall, E or W, the lower board 67 is omitted. At the outer ends of the cross-partitions the end-stiles 60 abut the inner edges of the studs 44 of the walls E and W, and the rails lap the sides of said studs to prevent outward displacement of said partitions. Cleats 68 secured between the end portions of the upper rails 63 of the cross-partitions, beneath the wall-rails 43, prevent inward displacement of said partitions. A similar cleat 58 is disposed between the upper rails 53 of the main partitions at the rear wall N. The inner ends of the rail members of the cross-partitions abut the adjacent edges of the center stiles 51 of the main partitions, being thereby prevented from outward displacement, and inward displacement of the upper portions of the cross-partitions at said ends thereof is prevented by blocks 70 secured to the upper rails 53 of the main partitions, as shown in Figs. 3 and 5. Inward displacement of the lower portions of all the partitions is prevented by the litter-pen floors 59 and 69 which are removably disposed respectively upon the main floor 12 between the main partitions and cross-partitions, extending in from the sills 18 and terminating adjacent to the heater, as shown. At the ends and longitudinal edges of the litter-pen floors are raised strips or cleats 71, which serve as frame members for the removable floor-portions, and also prevent scattering of bedding material placed in the litter-pens, particularly at the entrances to said pens from the main pens. The litter-pen floors also serve to insulate and conserve heat at the bottoms of the litter-pens, and, in conjunction with the raised cleats 71 at their edges, keep the litter-pens dry by excluding therefrom the moisture, such as from spilled slops, which may be upon the floors of the main pens. The ends of the litter-pens adjacent to the stove or heater 49 are defined by vertical screens 72, which extend up from the floors 59 and 69 to the level of the ledge-strips 56 and 66. Upon said ledge-strips are removably disposed the covers 73 and 74, the latter being between the cross-partitions and extending from the walls E and W to the main partitions, and the covers 73 being between the main partitions and extending in to the heater-cover frame 75. Said frame is spaced from the stove 49, and hinged thereto are metal plates 76 which form the heater-cover, the inner edges of said plates resting upon the top of the stove as shown in Fig. 1, to thus confine the greater part of the heat below the covers and to cause maximum radiation of heat from the stove through the screens 72 into the inner ends of the litter-pens. The end of the litter-pen adjoining the front wall S is closed by a special vertical cross-piece 77, which is held slidably in guides 78 secured to the main partitions, said member 77 being needed when the lower section 41 of the main door is opened, and then serving to prevent opening the front end of said litter-pen. The litter-pen-covers 73 and 74 are reinforced by cross-cleats 79 extending transversely beneath them as shown, whereby the same are adapted to serve as a walk or platform for use of the attendant when inspecting and caring for the animals in the pens. Ordinarily it will be unnecessary for the attendant, who enters the building at the main door 40—41 in the front wall S, to leave the aisle or gangway between the main longitudinal partitions, but if it is desired to do so he may step over the middle portions of the main partitions onto the covers 74 of the litter-pens formed between the cross-partitions. For inspection and cleaning of the stove 49 the cover-plates 76 may be swung open, and if it is desired to inspect, clean or renew the bedding material in the litter-pens, the covers 73 and 74 may be removed from said pens by merely lifting them off the supporting ledge-strips 56 and 66. The space over the covers 74, between the cross-partitions, may be used for the storage of feed or bedding material, in small quantities for immediate use.

In the two-pen structure shown in Fig. 2, the same general construction is employed as in the four-pen house above described, but the litter-pens are arranged adjoining one of the longitudinal walls, so that only one main longitudinal partition is required, and one cross-partition to separate the two main pens for the adult animals. The parts of the modified structure corresponding with those of the described four-pen house are identified by the same reference numerals with prime indices (′) added thereto.

In the modified four-pen structure represented diagrammatically in Fig. 9, there are single cross-partitions between the pairs of main pens, the two main partitions are spaced apart far enough to accommodate two litter-pens between the same at each end, and the pairs of parallel litter-pens are separated by special low partitions arranged beneath the litter-pen covers. In Fig. 9 the parts corresponding with those of the first-described four-pen structure are identified by the same reference numerals with double prime indices (″) added thereto, and the general analogy of structure is such that more detailed reference thereto is believed to be unnecessary for a clear understanding thereof.

Reverting to the first-described four-pen structure, it will be apparent that for each of the four main pens, formed at the corners of the building between the outer walls and the respectively adjacent main and cross-partitions, there is a communicating litter-pen to which the entrance from the main pen is through the opening formed by the omission of the partition-members 57 and 67 between the stiles 52—62 and the adjacent end-stiles 50—60. The litter-pens, because of their greater warmth, will be entered instinctively by the young animals, and when within the litter-pens they will occupy the portions thereof at which the temperature is most agreeable, and therefore most beneficial, to them; moving to the inner ends of the pens near the heater when greater warmth is desired, and moving toward the outer ends of the pens when a lower temperature is desired. Apart from the heat supplied by the stove 49, the central part of the building will be warmest because of being most remote from the outer walls; and when the several litter-pens are occupied by the young animals, clustered together at the contiguous ends of the pens, their body-heat is confined by the closed sides and covers of the pens, and is further conserved by the double floors and the bedding material, so that a considerably higher temperature will be maintained in the litter-pens than in the open main pens.

The use of the double, spaced-apart, partitions between the main pens for the adult animals, prevents the latter from injuring each other by fighting, as will sometimes occur when they are separated only by a single partition, unless such partition is without openings, and of such height that the animals cannot reach each other over the top by standing rampant. Injury to the young animals is also likely to result when fighting between the adults is not prevented.

The building is preferably erected with its front wall 8 at the south, so that except during extremely cold weather the upper section 40 of the main door may be left open during the day to directly admit sunlight to the building. When the house is so partitioned, the windows 45 and 46 will be at the east and west sides of the building, and will therefore admit sunlight during the forenoon and afternoon periods. Said windows are preferably glazed with trans-actinic glass-substitutes, such as are now commercially available. The open partitions permit the light from the windows to pass into all of the pens, or into some portions thereof, substantially throughout the day. The mounting of the building upon the skids or runners, enables the same to be readily moved from place to place locally, whereby the swine-breeder or herdsman may dispose the building upon fresh uncontaminated ground as often as may be desirable. The facility with which the building may be erected, or disassembled for transportation to a distance, makes the same especially desirable for tenant-farmers.

In general, it will be seen that my invention provides an efficient and economical housing structure, particularly adapted for use by swine-breeders or sheep breeders, and enabling the farrowing or lambing and subsequent care of the young to be conducted at any season of the year and regardless of climatic conditions.

Now, having described my invention, what I claim and desire to secure by Letters Patent is:

1. In a farrowing house, the combination with a suitable inclosure, of a plurality of partitions arranged to divide the space within said inclosure into a plurality of main pens, there being a laterally spaced pair of said partitions between each pair of the main pens, the space intermediate said pairs of partitions forming litter-pens, there being openings in the partitions to admit smaller animals from each main pen to an adjacent litter-pen, and removable covers for said litter-pens.

2. In a farrowing house, partitions dividing the inclosed space to form a plurality of main pens and a plurality of litter-pens, each litter-pen extending from the central to a peripheral portion of the inclosure, and communicating near the outer end only with an adjacent main pen and heating means interposed between the adjacent ends of the litter-pens.

3. In a structure of the class described, pairs of laterally spaced partitions traversing the inclosed space to divide the same into a plurality of main pens and gangways interposed between said main pens, raised horizontal covers disposed in said gangways to provide inclosed chambers beneath them, there being openings in the lower portions of the partitions to afford limited access to each of said chambers from a respectively adjacent main pen, and means for heating said chambers at one end only.

4. In a structure of the class described, an inclosure, means therein dividing the inclosed space into main pens and litter-pens, each litter-pen having an opeing to admit small animals only from an adjacent main pen, said litter-pens extending from an intermediate portion substantially to an outer portion of the inclosure, a common heating means for heating the litter-pens each from one end only, and covers for said litter-pens, said covers forming gangway floors and serving to retain heat in the pens thereunder.

5. In a structure of the class described, an inclosure, a plurality of main pens therein, a litter-pen adjacent to each main pen and extending from an intermediate portion substantially to a peripheral portion of the inclosure and having an opening into the adjacent main pen for admitting therefrom small animals only, a common means for supplying heat to the litter-pens at one end thereof only, each litter-pen having a low cover serving as a gangway floor and to retain and direct heat within the respective litter-pen, and side members for each litter-pen adjacent to the heating means for retaining and directing heat therefrom toward the opposite end of the pen.

6. In a farrowing house, an inclosure, means for dividing the same into a plurality of main pens and a corresponding number of litter-pens, each litter-pen having an opening into an adjacent main pen for admitting therefrom small animals only, each litter-pen extending from an intermediate portion substantially to a peripheral portion of the inclosure, and low covers for the litter-pens, said covers arranged to serve as gangway floors and for retaining in the litter-pens as a group the body-heat of the animals therein.

7. In a farrowing house, an inclosure, means for dividing the same into a plurality of main pens and a plurality of litter-pens, each litter-pen extending alongside a main pen and having an opening into said main pen to admit therefrom small animals only, the several litter-pens being so arranged that each has one end adjacent to an end of each of the others, and one end extending to a peripheral portion of the inclosure, low covers for said litter-pens adapted to retain in the litter-pens as a group the body-heat of the animals therein, the adjacent ends of said litter-pens communicating to enable free interchange of heat from one to another.

8. In a farrowing house, an inclosure, partitions for dividing the same into a plurality of main pens and a plurality of litter-pens, the several litter-pens being so arranged that each has one end adjacent to an end of each of the others and extends therefrom alongside one of the main pens substantially to a peripheral portion of the inclosure, the adjacent ends of the litter-pens communicating to enable interchange of heat between them, and means for retaining in the litter-pens as a group the body-heat of the animals therein, there being openings in the dividing partitions for admitting small animals only from each of the main pens to the adjacent litter-pen.

9. In a farrowing house, an inclosure, partitions dividing the same into a plurality of main pens and a corresponding number of litter-pens, the latter being so arranged that each has one end adjacent to an end of each of the others and extends therefrom alongside one of the main pens substantially to a peripheral portion of the inclosure, a common heating means arranged at the adjacent ends of the litter-pens, there being openings in the dividing partitions adjacent to the remote ends of the litter-pens for admitting thereto small animals only from the adjoining main pen, and means for retaining the common heat at the adjacent ends of the litter-pens and directing a portion thereof toward the remote ends thereof, whereby to maintain a graduated temperature in the several longitudinal portions thereof.

10. In a farrowing house, an inclosure, partitions dividing the inclosed space to form a plurality of main pens and a like number of litter-pens, the latter each communicating with an adjacent main pen and extending alongside the latter from an intermediate portion substantially to a peripheral portion of the inclosure, means for heating the adjacent ends of the litter-pens, means for retaining the heat therein and directing a portion thereof toward the outer end portions of the pens, whereby to effect a graduation of temperature longitudinally of said pens, and supplemental floors for said litter-pens, said supplemental floors having raised edge portions for retaining bedding material in the litter-pens and excluding therefrom liquids from the floors of the main pens.

11. In a multiple-pen farrowing-house, the combination with a rectangular walled inclosure, of a plurality of partitions disposed parallel with the walls of the inclosure and dividing the space therein to form a plurality of main pens and litter-pens interposed between said main pens, the litter-pens each having a portion adjacent to a common center, heating means arranged at said common center, means covering said litter-pens to retain heat therein, and each litter-pen having an opening into an adjacent main pen, said opening proportioned to admit small animals only.

12. In a multiple pen farrowing house, the combination with a rectangular walled house, of a plurality of partitions disposed substantially parallel with the walls of the house and dividing the space therein to form a plurality of main pens and litter pens, one litter pen being provided for each main pen, the litter pens being provided with covering means adapted to retain heat therein and to serve as a walk, heating means arranged to furnish more heat to the litter pens than to the main pens, each litter pen having an opening into an adjacent main pen and proportioned to admit small animals only.

EVAN B. MORRIS.